Feb. 3, 1925.
I. C. GARDNER
1,524,788
STABILIZED OPTICAL SYSTEM
Filed Sept. 25, 1919     4 Sheets-Sheet 1
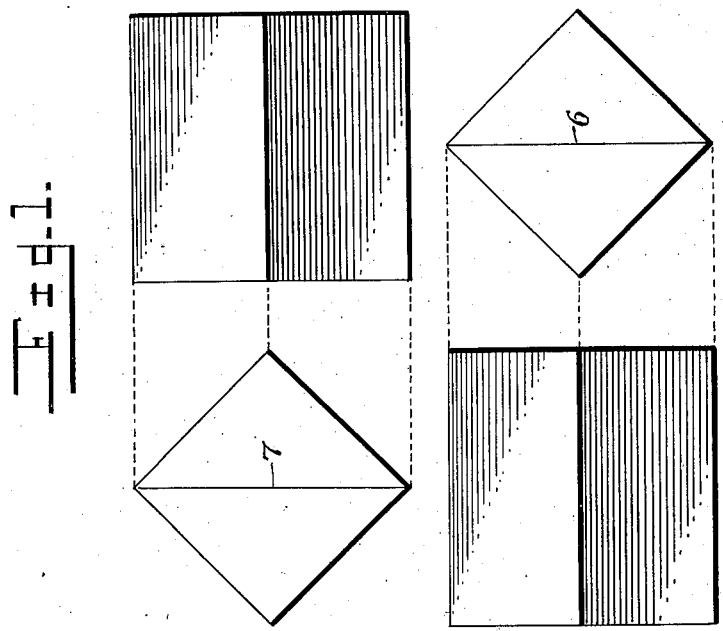
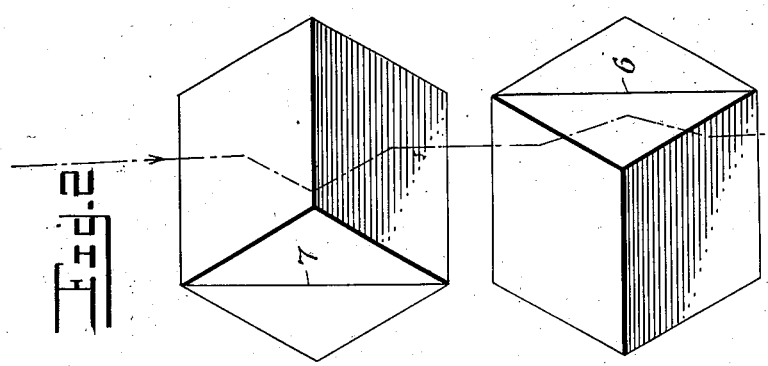
Inventor
Irvine C. Gardner

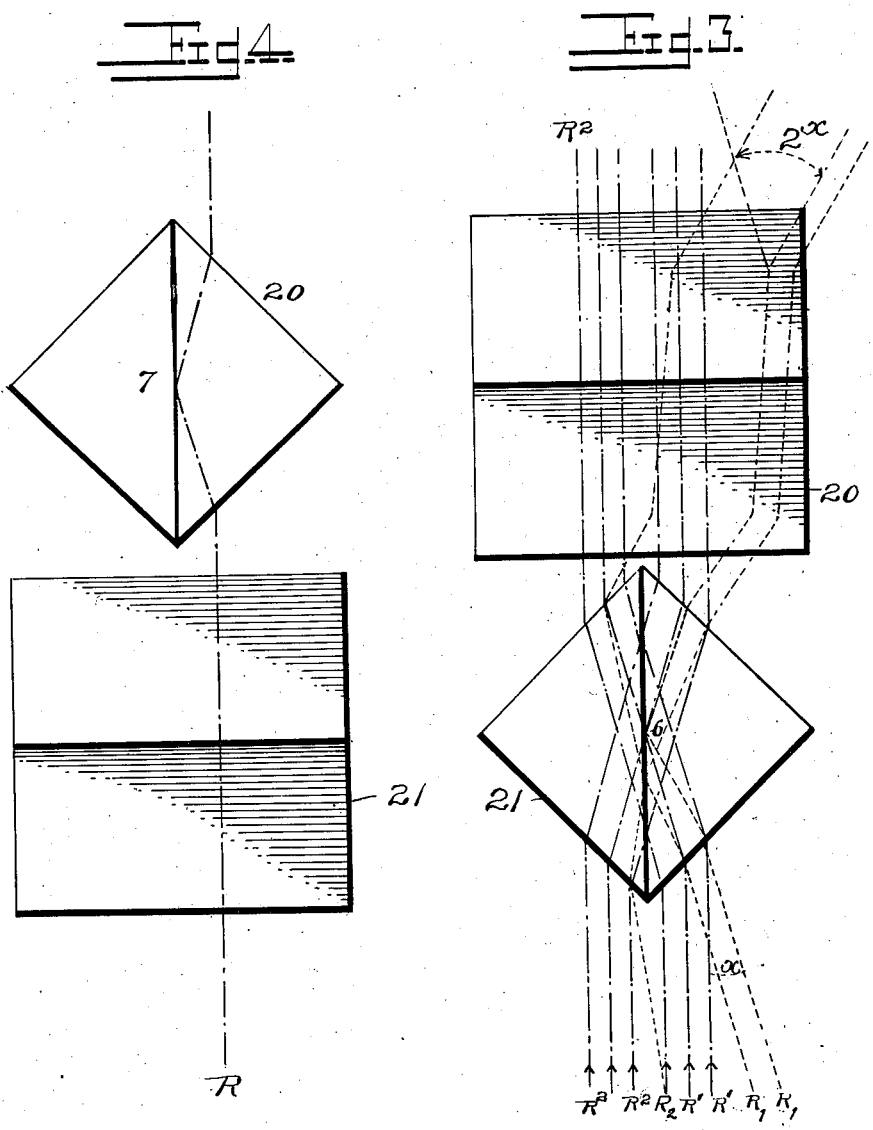

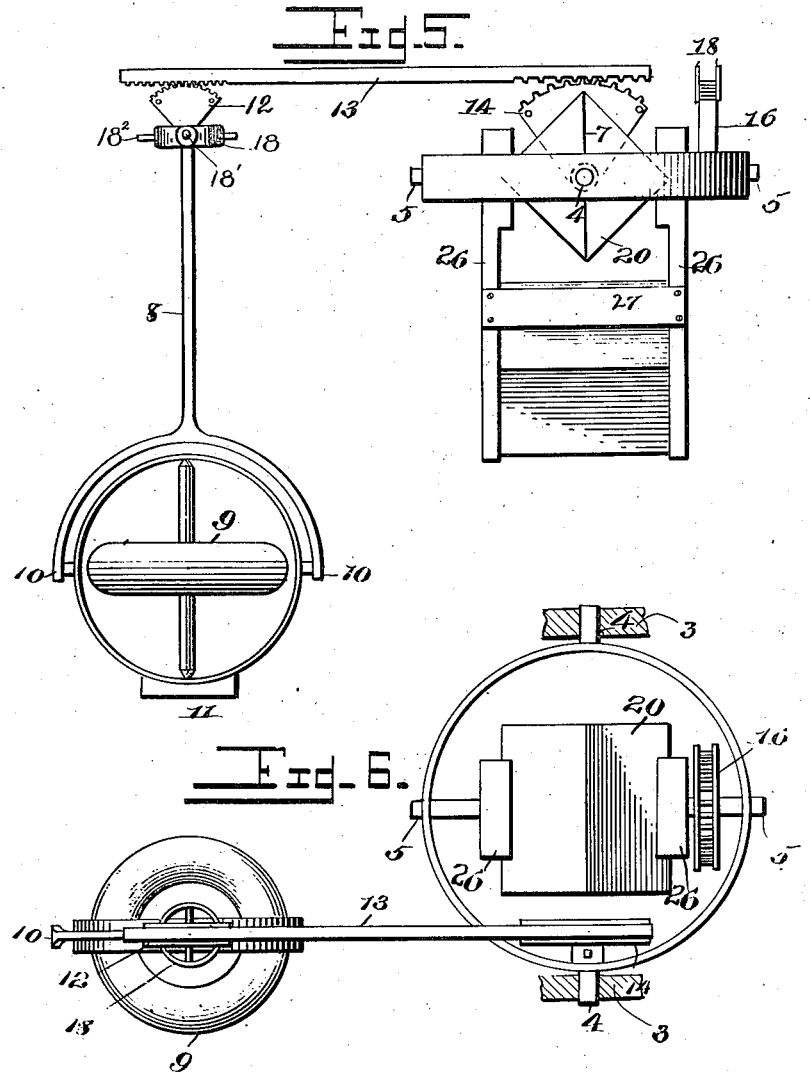

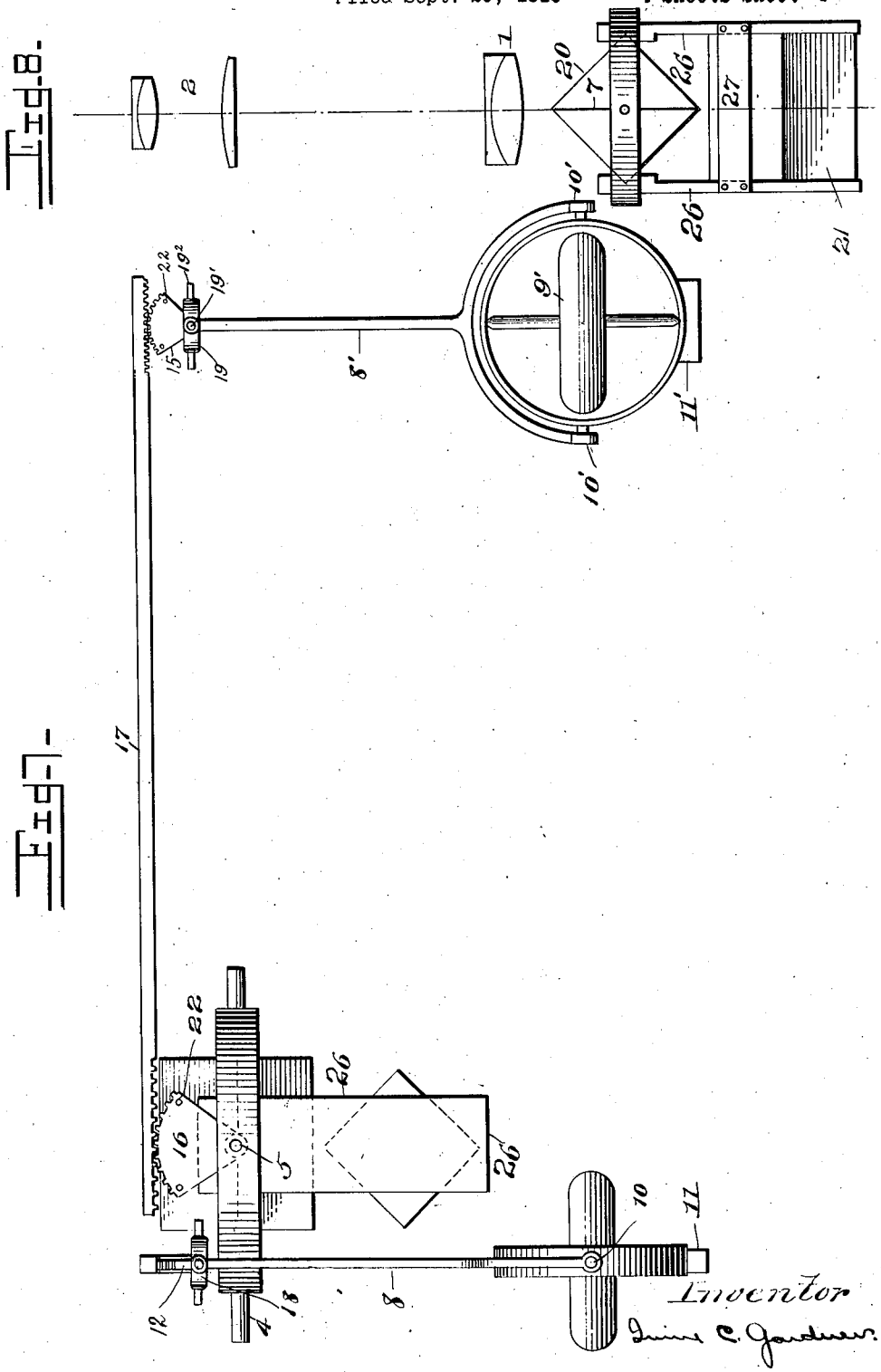

Patented Feb. 3, 1925.

1,524,788

UNITED STATES PATENT OFFICE.

IRVINE C. GARDNER, OF CAMBRIDGE, MASSACHUSETTS.

STABILIZED OPTICAL SYSTEM.

Application filed September 25, 1919. Serial No. 326,411.

(GRANTED UNDER THE ACT OF MARCH 3, 1883; 22 STAT. L. 625.)

*To all whom it may concern:*

Be it known that I, IRVINE C. GARDNER, a citizen of the United States, and a resident of Cambridge, in the county of Middlesex and State of Massachusetts, have invented an Improvement in Stabilized Optical Systems, of which the following is a specification.

The invention described herein may be used by the Government, or any of its officers or employees in prosecution of work for the Government, or by any other person in the United States, without payment of any royalty thereon.

This invention relates to a novel and useful device for stabilizing an observation instrument mounted on a moving body, as for example, an observation telescope on an aeroplane or in a balloon basket. The applications now contemplated for this invention are to bomb-sights, other fire control apparatus and navigation instruments.

The object of the invention is to apply a stabilizing mechanism to a comparatively light prism system, instead of to an entire observation instrument which is usually quite heavy. This permits more perfect stabilization with a gyroscope of the same weight, as at present used or equally perfect stabilization with a gyroscope of lighter weight. By this construction all adjustments, such as focusing, setting off deflections or altering the direction of the line of sight, can be made by moving suitable optical components in the telescope which is fastened rigidly to the aeroplane or other moving body. Consequently, the making of these adjustments will in nowise interfere with or disturb the stabilized elements. Furthermore, the relative position of the observer and the eyepiece remain fixed and any accidental pressure on the eyepiece has no effect on the stabilized elements.

In the following description, reference will be made to the accompanying drawings which show a means for carrying my invention into effect:

Figure 1 shows elevation and end views of the two prism groups, comprising the prism system;

Figure 2 is a perspective view of the prism system with the supporting frame-work removed;

Figure 3 is an elevation and Figure 4 is an end view of the prism system, showing the deflection of the light rays;

Figure 5 is a side view of the stabilizing system;

Figure 6 is a plan view of Figure 5;

Figure 7 is a side view of the stabilizing system taken at right angles to Figure 5; and Figure 8 is a view showing the relation of the prism system to the observation telescope.

Like numerals refer to corresponding parts throughout the several views of the drawings.

The prism system comprises a prism group 20 and a prism group 21 supported in vertical alignment by suitable frame-work made up of longitudinal member 26 and transverse member 27.

Each prism group is made up of two right triangular prisms, the dividing surfaces 6 and 7 of which are separated slightly so that they are not in optical contact, whereby total reflection will take place at each of these dividing surfaces. The upper part of the frame is suspended by means of a gimbal joint, comprising the usual pivots 5—5 and 4—4 arranged at right angles and connected by a ring. The gimbal joint is pivotally mounted on the fuselage of the aeroplane or moving body 3, by means of the pivots 4—4, so that when the prism system is in normal vertical position, the axis of the telescope will be in vertical alignment with the dividing surfaces of the prisms.

Secured to the pivot 4—4 is a gear sector 14 which meshes at one end with a rack 13, the other end of the rack being in engagement with a tooth sector 12 at the upper end of a pendulum 8, which carries at its lower end the gyroscope 9 which is mounted in friction bearings 10—10. The weight of lug 11 tends to keep the axis of the gyroscope in a vertical position. Near its upper end the pendulum 8 is supported by means of a gimbal joint, consisting of ring 18 and pivots 18', 18². Mounted to rotate with the pivots 5—5 is the tooth sector 16, meshing with teeth formed on one end of a rack bar 17, the opposite end of which engages gear teeth formed on a sector 15. The sector 15 is formed on the upper end of a pendulum 8' which carries at its lower end the gyroscope 9', similar in construction to the gyroscope 9 previously described. The pendulum 8' is also pivotally mounted on its upper end by means of a gimbal joint, consisting of ring 19 having pivots 19' and 19². The sector 14 has twice the radius and has twice the number of teeth as the sector 12, whereby only half the relative angular movement of the gyroscope is transmitted to the prism system. This same proportion also applies to relative sizes of the sectors 15 and 16.

All of the gear sectors are equipped with flanges 18 which are held in place by suitable fastening means indicated at 22, and their function is to retain the racks 13 and 17 on the sectors on angular movement of the mechanism. In Figures 5 and 7, these flanges have been removed in order to more clearly show the construction. It will be noted that in Figure 5, the gear sectors 14 and 16 are at right angles, and consequently, the gyroscopically controlled racks 13 and 17 are at right angles, whereby any rotation involving components about axes 4—4 and 5—5 will be compensated by the simultaneous action of the two stabilized elements.

In Figure 8 is illustrated the mounting of the prism system with relation to the usual telescope and objective 1 and eyepiece 2.

Figures 3 and 4 illustrate the manner in which the rays of light are refracted and reflected in passing through the prism system. The rays R', passing through the right prism 21 in Figure 3, are refracted to reflecting surface 6; thence reflected to the emergent surface of prism 21; thence, refracted to the lower surface of lower prism 20, Figure 4; thence, refracted to a reflecting surface 7, from which it is reflected to the emergent surface of prism 20, from whence, it is refracted and emerges parallel to the entering rays R', which are parallel to the optical axis of the telescope.

In a similar manner the rays R² which strike the left prism 21 of Figure 3 traverse a symmetrically placed path on the opposite side of the reflecting surfaces. When the axis of the prism system is parallel to the telescope, the light which enters the objective of the telescope traverses both of these paths of the prism system in equal amounts. When, however, the prism system rotates relative to the telescope, a greater amount of light is transmitted through one half of the system, the particular half depending upon the side to which the prism system rotates.

Assuming that the prism system is moved through an angle X, the rays R, will indicate the incident rays and they will be refracted and reflected in the manner similar to the rays R'. But owing to the angular movement of the reflecting surface, the angle of deviation will be $2^x$ as indicated in Figure 3. The rays R² which enter the opposite prism 21 will traverse symmetrical paths on the opposite side of the reflecting surface.

In explaining the functioning of the apparatus, it will be assumed that it is mounted upon an aeroplane. Suppose, then, that the aeroplane banks, tilting to the right so that the telescope, attached rigidly to the fuselage, inclines to the right at an angle of 10°. The force thus created tends to rotate the pendulum about the shaft at 18', and the gyroscope immediately precesses on the axis 10, 10. The bearing at 10, 10 is constructed so as to provide considerable friction, and consequently, any force tending to swing the pendulum about axis 18' has to do work in turning the gyroscope about the axis 10, 10 and the resulting motion of the pendulum, due to the force is effectually damped. Therefore, the gyroscopically stabilized element 12, Figure 5, retains its original orientation in space and moves relatively to the fuselage of the aeroplane through an equal angle of 10°.

The gear sector 12 is connected by means of rack bar 13 to the sector 14 and rotates the prism system about the axis 4—4, but with only half the angular movement. The ray of light R is reflected at the total reflecting surface 6, through twice the angle through which the reflected surface sweeps, and since, the reflecting surface moves through an angle of 5°, the reflected ray has been moved through an angle of 10°, corresponding to the angular movement of the aeroplane, and therefore, the object which was originally in the center of the field of view before the banking took place, will remain in the center and will to the eye of the observer remain fixed in the field, since the proportion of angular movement holds true for each angular increment. Should the telescope, due to the motion of the aeroplane, rotate about the axis 5—5 which is at right angles to axis 4—4, the second gyroscopic element causes the prism system to rotate about the axis 5—5 with half the angular movement of the telescope. In like manner any rotation involving components about axes 4—4 and 5—5 will impart movement to the prism system which will be the vector resultant of such component rotations.

While this device has been described as applied to an aeroplane, it is understood that it may be applied to any movable body, the angular position of which may vary. A rack and sector have been used in this illustration to transmit movement from the gyroscopic element to the prism system, but any mechanism which will transmit this movement in the desired proportion could readily be substituted.

Although changes may be made in the means employed for reducing my invention to practice, it will be understood that modifications of structure are within the purview of my invention when they come within the spirit and scope of the appended claims.

Having described my invention, what I claim as new and desire to secure by Letters Patent, is:—

1. The combination with an observation instrument of a body subject to angular variations of position comprising prism groups, a frame for holding said prism groups in position, a gimbal joint having pivots at right angles for suspending said frame from the body, a gear sector secured to each of said pivots and stabilizing means connected to said sectors for communicating their relative angular motions, in a definite proportion, to said prism groups.

2. The combination with an observation instrument of a body subject to angular variations of position comprising an optical system, a frame for holding said system, a gimbal joint for supporting said frame on the body, a gear sector on a pivot of the gimbal joint, a pendulum, a gimbal joint from which said pendulum is intermediately suspended, a gear sector on one end and a gyroscope on the other end thereof and a rack connecting said gear sectors whereby relative motion between said pendulum and body is transmitted in a definite proportion, to said optical system.

IRVINE C. GARDNER.